United States Patent
Misao

(12) 
(10) Patent No.: US 6,402,807 B1
(45) Date of Patent: Jun. 11, 2002

(54) METHOD FOR WET SMELTING OF IRON FAMILY METAL BEARING ORES

(76) Inventor: Takeo Misao, 39-9, 6-chome, Yohkohdai, Isogo-ku, Yokohama-shi, Kanagawa-ken (JP), 235-0045

( * ) Notice: Subject to any disclaimer, the term of this patent is extended or adjusted under 35 U.S.C. 154(b) by 0 days.

(21) Appl. No.: 09/666,659

(22) Filed: Sep. 20, 2000

Related U.S. Application Data

(63) Continuation-in-part of application No. 09/295,121, filed on Apr. 19, 1999, now abandoned.

(30) Foreign Application Priority Data

Apr. 20, 1998 (JP) .......................................... 10-109322

(51) Int. Cl.$^7$ .............................. C22B 3/06; C22B 3/22
(52) U.S. Cl. .............................. 75/430; 75/343; 75/365
(58) Field of Search ........................... 75/430, 365, 343

(56) References Cited

U.S. PATENT DOCUMENTS

| | | | |
|---|---|---|---|
| 125,464 A | | 4/1872 | Larkin |
| 1,858,274 A | * | 5/1932 | Kern et al. ................... 75/430 |
| 2,771,354 A | | 11/1956 | Moklebust |
| 3,258,332 A | | 6/1966 | Gravenor et al. |
| 3,476,553 A | | 11/1969 | Sebba et al. |
| 4,548,794 A | * | 10/1985 | Lowenhaupt et al. ....... 423/123 |
| 5,837,031 A | * | 11/1998 | Miyashita et al. ............ 75/505 |

FOREIGN PATENT DOCUMENTS

| | | |
|---|---|---|
| JP | 52-42408 | 4/1977 |
| JP | 53-103915 | 9/1978 |
| JP | 5-125425 | 5/1993 |

OTHER PUBLICATIONS

JIS M8212 (1994), "Iron ores—Methods for determination of total iron content", pp. 1–11. Partial English language translation enclosed. no month.

JIS M8213 (1995), "Iron ores—Method for determination of acid soluble iron (II) content", pp. 1–5. Partial English language translation enclosed. no month.

JIS K0050 (1991), "General rules for chemical analysis," Japanese Industrial Standards Committee, Japanese Standards Association, Tokyo, Japan. no month.

\* cited by examiner

*Primary Examiner*—Roy King
*Assistant Examiner*—Tima McGuthry-Banks
(74) *Attorney, Agent, or Firm*—Frishauf, Holtz, Goodman & Chick, P.C.

(57) ABSTRACT

A smelting process wherein very pure iron or various iron family metals are economically obtained from ores which contain iron family metals by hydrometallurgy. The process involves: (a) grinding an ore containing iron family metals to pulverize the ore into fines of 25 mesh undersize; (b) immersing the pulverized ore into at least one inorganic acid having a concentration of 1N to 8N to elute the iron family metals into the inorganic acid to carry out a leaching; (c) filtering the resultant mixture of residue and inorganic acid containing eluted iron family metals to obtain a filtrate and a gangue; (d) adding an alkali to the filtrate obtained in step (c), whereby a hydroxide of the iron family metal is precipitated; (e) filtering the resultant suspension which contains the hydroxide to collect the hydroxide of iron family metals; and (f) heating the collected hydroxide or a dried hydroxide thereof in a reducing atmosphere at a temperature of 400 to 500° C. for 5 minutes or longer to carry out a pre-reduction and then immediately heating the resultant pre-reduced collected hydroxide at a temperature of 600 to 950° C. for 5 minutes or longer to carry out a reduction in the reducing atmosphere.

21 Claims, No Drawings

METHOD FOR WET SMELTING OF IRON FAMILY METAL BEARING ORES

This is a continuation-in-part application of application Ser. No. 09/295,121 filed Apr. 19, 1999 now abandoned.

BACKGROUND OF THE INVENTION

1. Field of the Invention

This invention concerns a smelting method to produce very pure iron or various iron family metals from ores which contain iron, nickel, cobalt, etc., by means of hydrometallurgy.

2. Background Information

Among those means to produce iron from iron ore in great quantity, the blast furnace process is usually adopted to the current and modern iron-making industry. In the case of the blast furnace process, a mixture of iron ore, fluxes, etc. are melted and reduced, then produced molten iron and slag are separated due to the difference of their specific gravity, and iron is extracted.

On the other hand, besides the blast furnace process, there are many so-called direct iron-making processes to extract iron from iron ores. For example, they are the Armco process, the treatment of Laterite and the Hoganas process.

In the case of the blast furnace process, however, a furnace of very large volume equipped with many large accessories is necessary in order to heat and melt the mixture of iron ore, fluxes, etc. with high thermal efficiency at an elevated temperature, so that a high construction cost is necessary. Since the iron produced in this case usually contains 2% or more of carbon, phosphorus, sulfur, etc. the iron is refined once again to make steel.

In contrast thereto, the reduced iron produced by the Armco process, the treatment of Laterite, etc. mostly contains $SiO_2$, $Al_2O_3$, etc. that are originally included in the iron ore. In the case of the Hoganas process, it is impossible to completely remove $SiO_2$, $Al_2O_3$, etc. that are included in the iron ore. Accordingly, in order to completely remove $SiO_2$, $Al_2O_3$, etc. from the reduced iron, it is necessary to carry out refining once again, as in the case of the blast furnace process.

As such, in order to obtain very pure iron which contains no $SiO_2$, $Al_2O_3$, etc. from the iron ore, it is required to provide remelting and refining facilities, which results in a high construction cost. Heretofore, there has not been a wet smelting technique for mass-production which does not need such melting and refining process.

SUMMARY OF THE INVENTION

The present invention was developed intending to solve the aforementioned problems, and also to provide a specific refining method by hydrometallurgy, thereby very pure iron or various iron family metals are obtained from ores containing iron family metals.

The inventor made an intense study to solve the aforementioned problems. As a result of the study, it was discovered that if ores containing iron family metals are subjected to an artificially hastening treatment relating to the leaching of iron family metals into acid, namely, an "accelerated weathering treatment", those metals are eluted easily into acid, whereby a hydrometallurgy method carried out on iron family metals is realized.

The present invention was achieved based on the aforementioned knowledge, and it comprises specific features as set forth in the following procedures:

(a) a grinding process wherein ores containing iron family metals are pulverized into fines of 25 mesh undersize (hereinafter referred to as the "pulverized ore"; the "ore" is a kind of native mineral, but it does not cover processed resources such as iron bearing byproducts of the chemical industry, etc. (e.g., sludge, cinder, residue, or gangue)), (b) a leaching process wherein iron family metals in the pulverized ore are eluted into at least one inorganic acid, such that the pulverized ore is immersed into an inorganic dilute acid having a concentration of 1N to 8N, preferably 2N to 6N (hereinafter referred to as the "inorganic acid"), (c) a separation process to obtain a filtrate and gangue individually by filtering the mixture of residue and inorganic acid which contains the eluted iron family metals discussed above, (d) a precipitation process of a hydroxide of the iron family metals by the addition of an alkali to the filtrate obtained in the preceding step, and a filtration process applied to the suspension composed of the aforementioned hydroxide to collect a hydroxide of the iron family metals, and (e) reducing process of which the collected hydroxide is heated at a temperature of 600 to 950° C. for 5 minutes or longer in a reducing atmosphere immediately after a pre-reducing process carried out at a temperature of 400 to 500° C. for 5 minutes or longer in the same reducing atmosphere.

The present invention preferably comprises the specific feature of which a hydroxide of the iron family metals is rinsed with a sufficient amount of warm water (water at a temperature of 40 to 60° C., which is defined in JIS K0050 (1991)) before the reducing treatment thereof.

In order to collect an iron hydroxide, usually a centrifugal machine is used for filtration. However, the collected hydroxide is not discharged from the machine right after filtration, but warm water is added into the machine, and it is driven once again. After that the iron hydroxide is taken out. This is explained in more detail as follows.

In the neutralization process, a hydroxide (solid) of iron or an iron family metal and a liquor are produced. The liquor includes such salt(s) as $Na_2SO_4$ and NaCl. The kind of salt(s) depends on the kind of alkali used for neutralization.

A first separation by filtration involves charging the mixture of the hydroxide and the liquor described above into a centrifugal separator, sufficiently separating the hydroxide and the liquor, and stopping the revolution of the separator at once. At this moment, the liquor is discharged while the hydroxide remains in the separator. The dehydrated hydroxide thus obtained still includes some of the salt(s) discussed above.

A second separation by filtration involves pouring warm water into the hydroxide in the separator, and driving the separator once again in such manner, at first, slowly, then rapidly. As a result of this operation, the salt(s) absorbed in the hydroxide is eluted into the warm water and separated therefrom. After completion of this separation, the hydroxide is discharged from the separator.

The addition of warm water causes elution of some of the hydroxide. To prevent a decrease of the recovery ratio of iron, the addition of warm water is restricted once.

The present invention preferably comprises the following specific feature: between the steps (a) and (b), the pulverized ore prepared by step (a) is subjected to reducing such that it is heated at a temperature of 600 to 1100° C. for 5 minutes or longer. Further, it is preferable that at the time of reducing, at least any one among an oxide, a hydroxide, or a carbonate of zinc, calcium, lead or potassium is added as a catalyst. Furthermore, after the reducing treatment, the reduced ore is preferably magnetically separated.

Preferably, the present invention further comprises the following specific feature: between the steps (b) and (c), the pulverized ore ground to the desired size as described hereinabove is agitated successively for 30 minutes or longer, as it is immersed in the inorganic acid of the aforementioned concentration.

Furthermore, the invention preferably comprises the following specific feature: between steps (b) and (c), the pulverized ore ground to the desired size as described hereinabove is heated for 1 minute or longer, as it is immersed in the inorganic acid of the aforementioned concentration.

The invention preferably comprises the following specific feature: between the steps (b) and (c), the pulverized ore ground to the desired size as described hereinabove is agitated successively for 30 minutes or longer and also heated for 1 minute or longer, as it is immersed in the inorganic acid of the aforementioned concentration. In this case, the agitating is not always required to be before the heating.

As described hereinabove, according to the present invention a wet smelting process is provided wherein very pure iron or various iron family metals are obtained very economically in a large quantity from ores which contain iron family metals, which is in contrast to the blast furnace process or the like which need high construction expenses. Further, the temperature of the heating process for reducing the collected hydroxide of the iron family metals is below the melting point of iron family metals. Also an inorganic acid is used for elution of iron family metals from ore and a reducing agent used for the reducing is cheap and readily obtainable, whereby the production cost will be cheaper than that of other processes applied heretofore.

According to iron and steel making processes applied heretofore, the use of high quality iron ore is always a precondition, while in the process of the present invention, not only high quality iron ores, but also poor quality iron ores that are abundant resources may be used. Moreover, strongly coking coal necessary for the pig iron process is not needed.

In addition, since the form of very pure iron or various iron family metals obtained by the process of the present invention is powdery, they are able to be subjected to sintering using an appropriate mold as it is, without the addition of additional elements to the powder. Accordingly, a working, a heat treatment, or the like which were heretofore essential processes, may be omitted in the present invention, and also various forms of product are able to be manufactured economically and directly from the powder.

As discussed hereinbefore, according to the present invention, various excellent commercial advantages are provided.

DETAILED DESCRIPTION OF THE INVENTION

When the usual hydrometallurgy technique, which intends to remove such inclusions as $SiO_2$ and $Al_2O_3$ contained in ores, is applied, normally it is very difficult or an extremely long time to elute the iron family metals into at least one inorganic dilute acid is required, even though such depends on the mineralogical structure of the ores.

Therefore, in the present invention, firstly, an ore is ground to 25 mesh undersize, and the pulverized ore is immersed into at least one inorganic acid. Accordingly, iron family metals in the ore are able to be eluted into the inorganic acid. If the size of the said ore is coarse, namely 25 mesh oversize, or the concentration of the inorganic acid is less than 1N, elution of iron family metals will need an extremely long time, so that those conditions are impractical.

As to the ores useful in the present invention, most ores which contain iron family metals are available. They are, for instance, iron rich ores that include hematitic ore, magnetitic iron ore, limonitic, etc., low grade ores that are Jarosite, etc., and Laterite. Depending on the composition of the ore, pure iron or metals which contain iron, nickel, cobalt, etc., are obtainable.

Grinding of the ores is easily realized with usual jaw crushers, ball mills, etc.

Pertaining to the inorganic acid used for elution of the iron family metals from the ores discussed hereinabove, hydrochloric acid, sulfuric acid, sulfurous acid, aqua regia, etc. can be used.

Subsequently, the aforementioned mixture of residue and inorganic acid which contains eluted iron family metals described above is filtered to separate a filtrate and gangue. After that, an appropriate alkali is added to the filtrate separated from the gangue, whereby a hydroxide of the iron family metals is precipitated. Then, the precipitated hydroxide of the iron family metals is collected by filtrating of the suspension which contains the hydroxide thereof.

As to the alkali used for formation of the hydroxide of iron family metals, limestone, burnt lime, slaked lime, as well as sodium hydroxide, potassium hydroxide, calcium hydroxide, aqueous ammonia, and the like, can be used.

As the next procedure, the collected hydroxide of the iron family metals is converted to an easily reducible one, when it is pre-reduced by heating at a temperature of 400 to 500° C. for 5 minutes or longer in a reducing atmosphere, then it is subjected-to reducing, that is heating at 600 to 950° C. for 5 minutes or longer. As such, a powdery very pure iron or various iron family metals is attainable.

When the temperature of pre-reducing, that is a process to convert the hydroxide of the iron family metals or a dried hydroxide thereof to an easily reducible one, is below 400° C., or above 500° C., an ensuing reduction which will be carried out at a temperature of 600 to 950° C. becomes difficult. Further, if the reducing temperature is below 600° C., it is not practical, since a long time is necessary for reducing. On the other hand, when the reducing temperature is above 950° C., a produced pure iron or various iron family metals tend to combine by sintering so that it becomes difficult to maintain a powdery state of product, whereby some serious problems for the usage of the product will occur.

The duration time for pre-reducing and reducing discussed above will be at least 5 minutes, respectively. If both or either of them are shorter than 5 minutes, the pre-reducing and/or the reducing are liable to be insufficient.

As to the reducing atmosphere for the pre-reducing and reducing of the hydroxide of the iron family metals, $H_2$ gas, HNX gas, producer gas mainly comprising CO and $H_2$, CO gas, ammonia gas, coke oven gas, natural gas, blast furnace gas, water gas, methane gas, and the like can be used. In this regard, when gases containing carbon are used, they are liable to decompose to C, $H_2$, $O_2$, etc. at an elevated temperature. Accordingly, it is recommendable to use a catalyst for preventing such decomposition.

Prior to the reducing of the hydroxide of the iron family metals, if rinsing with warm water is carried out, salt(s)

adhered on the iron family metals will be removed, therefore, the purity of pure iron or iron family metals obtained by reducing will be much improved. If salt(s) adhere on the hydroxide of the iron family metals, the solid subjected to reducing tends to sinter at a lower temperature, so that it becomes difficult to maintain a powdery state of the product.

Prior to immersing the ore which contains the iron family metals ground to 25 mesh undersize into the inorganic acid, if the pulverized ore is subjected to a reducing treatment, heated at a temperature of 600 to 1100° C. for 5 minutes or longer, elution of iron family metals into the inorganic acid will be remarkably hastened. In this regard, if the reducing temperature is below 600° C. or above 1100° C., and the duration time for reducing is shorter than 5 minutes, it is very difficult to attain the desired reducing effect. The above described matter is also a part of an "accelerated weathering treatment". In this regard, the metallization ratio is not always required to be 100%. In addition, as to the reducing treatment, any widely known process may be applicable.

The accelerated weathering treatment includes the following treatments:
 (i) grinding of ores as fine as possible to obtain the pulverized ore,
 (ii) reduction roasting of the pulverized ore, and
 (iii) addition of catalyst(s) to the pulverized ore right before the reduction roasting.

In this respect, the application of treatments (ii) and/or (iii) is determined according to the kind of the ore.

At the time of reducing of the ore which contains the iron family metals ground to 25 mesh undersize, if at least any one kind of catalyst such as an oxide, a hydroxide or a carbonate of zinc, calcium, lead or potassium is added thereto, the elution of the iron family metals into the inorganic acid will be additionally hastened.

The reducing treatment described above may be achieved by heating the ore in a non-oxygenating atmosphere with charcoal, coke, coal, sawdust;, cut paper, etc. or otherwise in a reducing atmosphere such as $H_2$ gas, HNX gas, producer gas mainly comprising CO and $H_2$, CO gas, ammonia gas, coke oven gas, natural gas, blast furnace gas, water gas and methane gas.

As to the ore which contains iron family metals ground to 25 mesh undersize, if it is subjected to a reducing treatment and a magnetic separation prior to immersing it into the inorganic acid, not only is the consumption of acid and alkali saved, but also the purity of produced pure iron or various iron family metals will be further improved.

The ore which contains the iron family metals is ground to 25 mesh undersize and reduced without a catalyst, then the reduced pulverized ore is immersed into the inorganic acid to elute the iron family metals. Next, the ore described above is agitated successively for 30 minutes or longer, or heated at a temperature within the range of 70 to 110° C., preferably 95 to 100° C., for one minute or longer, or both of such treatments are combined and implemented regardless of the order, as the ore is immersed into the inorganic acid, whereby the reaction time of the iron family metals and the inorganic acid will be remarkably reduced. The heating, in this case, is conducted with boiling water, super-heated steam, hot ceramics which are acid proof and heat resistance, etc.

In the preceding case, a catalyst is not added. Accordingly, the metal in a metallic compound contained in a catalyst is not captured in the product, therefore, the purity of produced very pure iron or various iron family metals will be improved.

EXAMPLES

The explanation of this invention will be set forth in accordance with the following Examples.

Example 1

Jarosite ore collected from the former Gunma Mine is ground and screened to obtain a specimen (pulverized ore) 40 mesh undersize. Then, this is immersed into sulfuric acid having a concentration of 3.5N for 96 hours to elute iron contained in the specimen into the acid. After that, the mixture of residue and sulfuric acid containing eluted iron is filtered to separate a filtrate and a gangue. Sodium hydroxide is added to the separated filtrate for precipitation of a hydroxide of iron.

Then, the suspension which includes a precipitated hydroxide of iron is filtered to collect the hydroxide thereof. The collected hydroxide of iron is reduced in a CO-gas atmosphere at a temperature of 760 to 780° C. for 10 minutes immediately after a pre-reducing process carried out at a temperature of 400° C. for 10 minutes in the same atmosphere to obtain a very pure powdery iron. The chemical composition of the very pure powdery iron obtained by Example 1 is set forth in Table 1. For reference, the chemical composition of reduced iron produced by the Armco process is additionally set forth in the same table.

TABLE 1

|  | T-Fe[1] | M-Fe[2] | C[3] | Ni | Cr | T-S[4] | $SiO_2$ | $Al_2O_3$ | MgO | P | S |
| --- | --- | --- | --- | --- | --- | --- | --- | --- | --- | --- | --- |
| Example 1 | 90.9 | 86.4 | 2.2 | 0.0 | 0.0 | 1.4 | 0.0 | 0.0 | 0.0 | 1.9 | 1.8 |
| Example 2 | 83.9 | 76.5 | 5.6 | 0.0 | 0.0 | 1.2 | 0.0 | 0.0 | 0.0 | 0.0 | 1.5 |
| Example 3 | 76.0 | 51.4 | 9.2 | 1.7 | 1.8 | 1.6 | 0.0 | 0.0 | 0.0 | 0.0 | 1.6 |
| Armco Process[5] | 90.9 | — | 2.4 | — | — | — | 3.2 | 0.6 | 0.44 | 0.11 | 2.4 |

The unit of each figure is wt. %.

The figures of the examples show the numerical values of powdery metals stored in the air.

1: total-Fe

2: metallic-Fe

3: "C" is composed of $Fe_3C$ and free carbon.

4: "T-S" is mainly $Na_2SO_4$.

5: The figures are quoted from the "Iron and Steel Handbook" published by the Iron and Steel Institute of Japan.

According to Table 1, it is apparent that SiO2 and $Al_2O_3$ are borne in reduced iron produced by the Armco process, while in the case of the present invention, very pure powdery iron which does not contain such inclusions is obtained.

Example 2

Hamersley ore-Australia is ground and screened to obtain a specimen (pulverized ore) 40 mesh undersize. Then, its half (by weight) of charcoal that is a reducing agent and ¹⁄₂₀ (by weight) of zinc oxide that is a catalyst are added to the specimen, and they are heated for reducing in an inert gas atmosphere at a temperature of 790° C. for 10 minutes.

After that, the reduced specimen (pulverized one) is subjected to magnetic separation, and immersed into sulfuric acid having a concentration of 3.5N for 72 hours, whereby the iron contained in the specimen is eluted into the sulfuric acid. Next, the mixture of residue and the sulfuric acid containing eluted iron is filtered to separate a filtrate and a gangue. Sodium hydroxide is added to the separated filtrate to precipitate a hydroxide of iron.

Then, the suspension which includes a precipitated hydroxide of iron is filtered to collect the hydroxide thereof. The collected hydroxide of iron is reduced in a CO-gas atmosphere at a temperature of 760 to 780° C. for 10 minutes immediately after a pre-reducing process carried out at a temperature of 400° C. for 10 minutes in the same atmosphere. Thug a very pure powdery iron is obtained. The chemical composition of the very pure powdery iron obtained by Example 2 is also set forth in Table 1.

According to Table 1, it is apparent that $SiO_2$ and $Al_2O_3$ are borne in the reduced iron produced by the Armco process, while in the case of the present invention, very pure powdery iron which does not contain such inclusions is obtained.

Example 3

Laterite ore-Venezuela is ground and screened to obtain a specimen (pulverized ore) 40 mesh undersize. Then, its half (by weight) of charcoal that is a reducing agent is added thereto, and they are heated for reducing in an inert gas atmosphere at a temperature of 820° C. for 10 minutes.

After that, the reduced specimen (pulverized one) is subjected to magnetic separation, and immersed into the mixture of sulfuric acid having a concentration of 3.5N and hydrochloric acid having a concentration of 2N for 96 hours, whereby the iron family metals contained in the specimen are eluted into the mixed acid. Next, the mixture of residue and the mixed acid containing eluted iron family metals is filtered to separate a filtrate and a gangue, and sodium hydroxide is added to the separated filtrate to precipitate a hydroxide of iron family metals.

Then, the suspension which includes the precipitated hydroxide of iron family metals is filtered to collect the hydroxide thereof. The collected hydroxide of iron family metals is reduced in a CO-gas atmosphere at a temperature of 760 to 780° C. for 10 minutes, immediately after a pre-reducing process carried out at a temperature of 400° C. for 10 minutes in the same atmosphere. A powdery metal which contains iron, nickel and chromium is obtained. The chemical composition of the powdery metal which contains iron, nickel and chromium obtained by Example 3 is additionally set forth in Table 1.

According to Table 1, it is apparent that $SiO_2$ and $Al_2O_3$ are borne in the reduced iron produced by the Armco process, while in the case of the present invention, powdery metal not inclusive of such inclusions, but including iron, nickel and chromium is obtained.

Example 4

Hamersley ore-Australia is ground and screened to obtain a specimen (pulverized ore) 40 mesh undersize. Then, its half (by weight) of powdery charcoal that is a reducing agent is added thereto, and they are heated for reducing in an inert gas atmosphere at a temperature of 940° C. for 5 minutes.

After that, the reduced specimen (pulverized one) is immersed into sulfuric acid having a concentration of 6N. The mixture is agitated successively, as the specimen is immersed in the sulfuric acid, for 0, 30 minutes, 1½ hours and 3 hours, respectively, to elute iron contained in the specimen.

Next, the mixture of residue and the sulfuric acid containing eluted iron is filtered to separate a filtrate and a gangue. Sodium hydroxide is added to the separated filtrate to precipitate a hydroxide of iron.

Then, the suspension which includes a precipitated hydroxide of iron is filtered to collect the hydroxide thereof. The collected hydroxide of iron is dried in air and it is reduced in a CO-gas atmosphere at a temperature of 760 to 780° C. for 10 minutes immediately after a pre-reducing process carried out at a temperature of 400° C. for 10 minutes in the same atmosphere to obtain a powdery iron.

The ratio of yield of powdery iron-expressed by the conversion value as Fe-obtained by Example 4 is set forth in Table 2.

TABLE 2

| | Duration time of agitation | | | |
|---|---|---|---|---|
| | 0 | 0.5 hr. | 1.5 hr. | 3 hr. |
| Ratio of yield of iron-conversion value as Fe (wt. %) | 5 | 15 | 35 | 45 |

According to Table 2, it is apparent that the ratio of yield of iron reaches 15 wt. %, 35 wt. % and 45 wt. %, where the specimens immersed in the sulfuric acid are agitated for successive 30 minutes, 1½ hours and 3 hours, respectively.

Example 5

Hamersley ore-Akustralia is ground and screened to obtain a specimen (pulverized ore) 40 mesh undersize. Then, its half (by weight) of powdery charcoal that is a reducing reagent is added thereto, and they are heated for reducing in an inert gas atmosphere at a temperature of 940° C. for 5 minutes.

After that, the reduced specimen (pulverized one) is immersed into sulfuric acid having a concentration of 6N. The mixture containing the specimen immersed in the sulfuric acid, is heated for 1½ minutes in boiling water, and thus iron contained in the specimen is eluted into the sulfuric acid.

Next, the mixture of residue and sulfuric acid containing eluted iron is filtered to separate the filtrate and gangue. Sodium hydroxide is added to the separated filtrate to precipitate a hydroxide of iron.

Then, the suspension which includes precipitated hydroxide of iron is filtered to collect the hydroxide thereof. The collected hydroxide of iron is dried in air and it is reduced in a CO-gas atmosphere at a temperature of 760 to 780° C. for 10 minutes immediately after a pre-reducing process carried out at a temperature of 400° C. for 10 minutes in the same atmosphere to obtain a powdery iron. The ratio of yield of powdery iron-expressed by a conversion value as Fe-obtained by Example 5 is set forth in Table 3.

TABLE 3

|  | Heating time (1.5 min.) |
|---|---|
| Ratio of yield of iron-Conversion value as Fe (wt. %) | 65 |

According to Table 3, it is apparent that the ratio of yield of iron reaches 65 wt. %, where the specimen is heated for 1½ minutes in the bolting water, as the specimen is immersed in the sulfuric acid.

Example 6

Hamersley ore-Australia is ground and screened to obtain a specimen (pulverized ore) 40 mesh undersize. Then, its half (by weight) of powdery charcoal that is a reducing agent is added thereto, and they are heated for reducing in an inert gas atmosphere at a temperature of 940° C. for 5 minutes.

After that, two reduced specimens are taken, and they are immersed into sulfuric acid having a concentration of 6N, respectively. Then, the mixtures of the specimen and sulfuric acid are heated for 1½ minutes in boiling water, as the specimens are immersed in the sulfuric acid, and also agitated successively for 30 minutes and 1½ hours individually. Thus, the iron contained in each specimen is eluted into the sulfuric acid.

Next, both mixtures of residue and sulfuric acid containing eluted iron are filtered to separate the filtrate and gangue. Sodium hydroxide is added to each separated filtrate to precipitate a hydroxide of iron.

Then, two specimens which include precipitated hydroxide of iron are filtered to collect the hydroxides thereof. The collected hydroxides of iron are dried in air and they are reduced in a CO-gas atmosphere at a temperature of 760 to 780° C. for 10 minutes immediately after a pre-reducing process carried out at a temperature of 400° C. for 10 minutes in the same atmosphere to obtain two sets of powdery iron. Each ratio of yield of powdery iron-expressed by a conversion value as Fe-obtained by Example 6 is set forth in Table 4.

TABLE 4

|  | Duration time of agitation | |
|---|---|---|
|  | 30 min. | 1½ hr. |
| Ratio of yield of iron-conversion value as Fe (wt. %) | 80 | 100 |

According to Table 4, it is apparent that the ratio of yield of iron ascends to 80 and 100 wt. %, where the specimens immersed into sulfuric acid are agitated for successive 30 minutes and 1½ hours, respectively, in addition to heating for 1½ minutes in boiling water.

What is claimed is:

1. A method for wet smelting of iron family metal bearing ores comprising:
   (a) grinding an ore containing iron family metals to pulverize the ore into fines of 25 mesh undersize;
   (b) immersing the pulverized ore from step (a) into at least one inorganic acid having a concentration of 1N to 8N to elute the iron family metals into the inorganic acid to carry out a leaching and to provide a mixture of residue and inorganic acid containing eluted iron family metals;
   (c) filtering the mixture of residue and inorganic acid containing eluted iron family metals from step (b) to obtain a filtrate and a gangue;
   (d) adding an alkali to the filtrate obtained in step (c) to form a hydroxide of the iron family metals which is precipitated and forming a suspension which contains the hydroxide of the iron family metals;
   (e) filtering the suspension which contains the hydroxide of the iron family metals from step (d) to collect the hydroxide of the iron family metals;
   (f) rinsing the hydroxide of the iron family metals from step (e) with a sufficient amount of water to carry out the rinsing at a temperature of 40 to 60° C.; and
   (g) heating the rinsed hydroxide from step (f) or a dried hydroxide thereof in a reducing atmosphere at a temperature of 400 to 500° C. for 5 minutes or longer to carry out a pre-reduction to provide a pre-reduced collected hydroxide and then immediately heating the pre-reduced collected hydroxide at a temperature of 600 to 950° C. for 5 minutes or longer to carry out a reduction in the reducing atmosphere.

2. The method for wet smelting of iron family metal bearing ore according to claim 11 further comprising between steps (a) and (b) heating the pulverized ore from step (a) at a temperature of 600 to 1100° C. for 5 minutes or longer to carry out a reduction roasting.

3. The method for wet smelting of iron family metal bearing ores according to claim 2, further comprising right after the reduction roasting carried out between steps (a) and (b) magnetically separating the reduced ore obtained in the reduction roasting.

4. The method for wet smelting of iron family metal bearing ores according to claim 1, further comprising between steps (b) and (c) stirring the pulverized ore immersed in the inorganic acid for 30 minutes or longer.

5. The method for wet smelting of iron family metal bearing ores according to claim 2, further comprising between the steps (b) and (c) stirring the pulverized ore immersed in the inorganic acid for 30 minutes or longer.

6. The method for wet smelting of iron family metal bearing ores according to claim 1, further comprising between steps (b) and (c) heating the pulverized ore immersed in the inorganic acid for one minute or longer.

7. The method for wet smelting of iron family metal bearing ores according to claim 2, further comprising between steps (b) and (c) heating the pulverized ore immersed in the inorganic acid for one minute or longer.

8. The method for wet smelting of iron family metal bearing ores according to claim 1, further comprising between steps (b) and (c) stirring the pulverized ore immersed in the inorganic acid for 30 minutes or longer, and then heating the pulverized ore immersed in the inorganic acid for one minute or longer.

9. The method for wet smelting of iron family metal bearing ores according to claim 2, further comprising between steps (b) and (c) stirring the pulverized ore immersed in the inorganic acid for 30 minutes or longer, and then heating the pulverized ore for one minute or longer.

10. The method for wet smelting of iron family metal bearing ores according to claim 1, further comprising between steps (b) and (c) heating the pulverized ore immersed in the inorganic acid for one minute or longer, and then stirring the pulverized ore immersed in the inorganic acid for 30 minutes or longer.

11. The method for wet smelting of iron family metal bearing ores according to claim 2, further comprising between steps (b) and (c) heating the pulverized ore immersed in the inorganic acid for one minute or longer, and then stirring the pulverized ore immersed in the inorganic acid for 30 minutes or longer.

12. The method for wet smelting of iron family metal bearing ores according to claim 1, wherein the ore is selected from the group consisting of hematitic ore, magnetitic ore and limonitic ore.

13. The method for wet smelting of iron family metal bearing ores according to claim 1, wherein the ore is selected from the group consisting of Jarosite ore, and Laterite ore.

14. The method for wet smelting of iron family metal bearing ores according to claim 1, wherein the inorganic acid is at least one acid selected from the group consisting of hydrochloric acid, sulfuric acid, sulfurous acid and aqua regia.

15. The method for wet smelting of iron family metal bearing ores according to claim 2, wherein the inorganic acid is at least one acid selected from the group consisting of hydrochloric acid, sulfuric acid, sulfurous acid and aqua regia.

16. The method for wet smelting of iron family metal bearing ores according to claim 1, wherein the alkali is selected from the group consisting of limestone, burnt lime, slaked lime, sodium hydroxide, potassium hydroxide, calcium hydroxide and aqueous ammonia.

17. The method for wet smelting of iron family metal bearing ores according to claim 2, wherein the alkali is selected from the group consisting of limestone, burnt lime, slaked lime, sodium hydroxide, potassium hydroxide, calcium hydroxide and aqueous ammonia.

18. The method for wet smelting of iron family metal bearing ores according to claim 1, wherein the reducing atmosphere includes a gas selected from the group consisting of $H_2$ gas, HNX gas, producer gas mainly comprising CO and $H_2$, CO gas, ammonia gas, coke oven gas, natural gas, blast furnace gas, water gas and methane gas.

19. The method for wet smelting of iron family metal bearing ores according to claim 2, wherein the reducing atmosphere includes a gas selected from the group consisting of $H_2$ gas, HNX gas, producer gas mainly comprising CO and $H_2$, CO gas, ammonia gas, coke oven gas, natural gas, blast furnace gas, water gas and methane gas.

20. A method for wet smelting of iron family metal bearing ores comprising:

(a) grinding an ore containing iron family metals to pulverize the ore into fines of 25 mesh undersize;

(b) heating the pulverized ore from step (a) in the presence of one or more catalysts selected from the group consisting of an oxide, a hydroxide and a carbonate of an element selected from the group consisting of zinc, calcium, lead and potassium at a temperature of 600 to 1100° C. for 5 minutes or longer to carry out a reduction roasting;

(c) immersing the pulverized ore from step (b) into at least one inorganic acid having a concentration of 1N to 8N to elute the iron family metals into the inorganic acid to carry out a leaching and to provide a mixture of residue and inorganic acid containing eluted iron family metals;

(d) filtering the mixture of residue and inorganic acid containing eluted iron family metals from step (c) to obtain a filtrate and a gangue;

(e) adding an alkali to the filtrate obtained in step (d) to form a hydroxide of the iron family metals which is precipitated and forming a suspension which contains the hydroxide of the iron family metals;

(f) filtering the suspension which contains the hydroxide of the iron family metals from step (e) to collect the hydroxide of the iron family metals; and (g) heating the hydroxide from step (g) or a dried hydroxide thereof in a reducing atmosphere at a temperature of 400 to 500° C. for 5 minutes or longer to carry out a pre-reduction to provide a pre-reduced collected hydroxide and then immediately heating the pre-reduced collected hydroxide at a temperature of 600 to 950° C. for 5 minutes or longer to carry out a reduction in the reducing atmosphere.

21. The method for wet smelting of iron family metal bearing ores according to claim 20, wherein the ore is selected from the group consisting of hematitic ore, magnetitic ore, limonitic ore, Jarosite ore and Laterite ore; the inorganic acid is at least one acid selected from the group consisting of hydrochloric acid, sulfuric acid, sulfurous acid and aqua regia; the alkali is selected from the group consisting of limestone, burnt lime, slaked lime, sodium hydroxide, potassium hydroxide, calcium hydroxide and aqueous ammonia; and the reducing atmosphere includes a gas selected from the group consisting of $H_2$ gas, HNX gas, producer gas mainly comprising CO and $H_2$, CO gas, ammonia gas, coke oven gas, natural gas, blast furnace gas, water gas and methane gas.

* * * * *

UNITED STATES PATENT AND TRADEMARK OFFICE
CERTIFICATE OF CORRECTION

PATENT NO.    : 6,402,807 B1
DATED         : June 11, 2002
INVENTOR(S)   : Takeo Misao It is certified that error appears in the above-identified patent and that said Letters Patent is hereby corrected as shown below:

Column 10,
Line 23, after "claim" replace "11" with -- 1 --.

Signed and Sealed this

Twentieth Day of July, 2004

JON W. DUDAS
*Acting Director of the United States Patent and Trademark Office*